(12) United States Patent
Rigollet et al.

(10) Patent No.: US 9,182,063 B2
(45) Date of Patent: Nov. 10, 2015

(54) CLAMPING COLLAR TIGHTENED BY A THREADED ROD AND TWO NUTS

(75) Inventors: Nicolas Rigollet, Romorantin (FR); Fabrice Prevot, Selles sur Cher (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 247 days.

(21) Appl. No.: 14/005,639

(22) PCT Filed: Mar. 12, 2012

(86) PCT No.: PCT/FR2012/050510
§ 371 (c)(1),
(2), (4) Date: Sep. 17, 2013

(87) PCT Pub. No.: WO2012/127149
PCT Pub. Date: Sep. 27, 2012

(65) Prior Publication Data
US 2014/0007385 A1    Jan. 9, 2014

(30) Foreign Application Priority Data
Mar. 18, 2011 (FR) ..................................... 11 52239

(51) Int. Cl.
*F16L 33/06* (2006.01)
*F16L 23/08* (2006.01)
(52) U.S. Cl.
CPC ................. *F16L 33/06* (2013.01); *F16L 23/08* (2013.01); *Y10T 24/1443* (2015.01)

(58) Field of Classification Search
CPC . Y10T 24/1441; Y10T 24/1443; F16L 23/08; F16L 33/04; F16L 33/06
See application file for complete search history.

(56) References Cited

U.S. PATENT DOCUMENTS

| | | | |
|---|---|---|---|
| 2,352,372 A | | 6/1944 | Colarusso |
| 2,828,525 A | * | 4/1958 | Gail .................................. 24/279 |
| 3,584,352 A | * | 6/1971 | Turner ............................ 24/279 |
| 4,834,431 A | | 5/1989 | Calmettes et al. |
| 7,516,522 B2 | | 4/2009 | Chene et al. |

FOREIGN PATENT DOCUMENTS

| | | |
|---|---|---|
| EP | 0088507 A1 | 9/1983 |
| EP | 0305232 A1 | 3/1989 |
| EP | 1540229 B1 | 5/2008 |
| GB | 2804 | 0/1911 |
| WO | 2004008015 A1 | 1/2004 |

* cited by examiner

*Primary Examiner* — Robert J Sandy
(74) *Attorney, Agent, or Firm* — The Webb Law Firm

(57) ABSTRACT

Disclosed is a collar which includes a belt carrying first and second tightening lugs, a threaded tightening rod, and first and second nuts that co-operate respectively with the lugs so as to bring them towards each other by screw engagement with the rod. The second nut is retained so that it is prevented from moving in rotation relative to the second lug and the rod has first and second threads that co-operate respectively with the first nut and with the second nut in such a manner that driving the first nut in its screwing direction successively causes said first nut to be screwed onto the first thread, and the tightening rod to be driven, thereby screwing said tightening rod into the second nut.

8 Claims, 2 Drawing Sheets

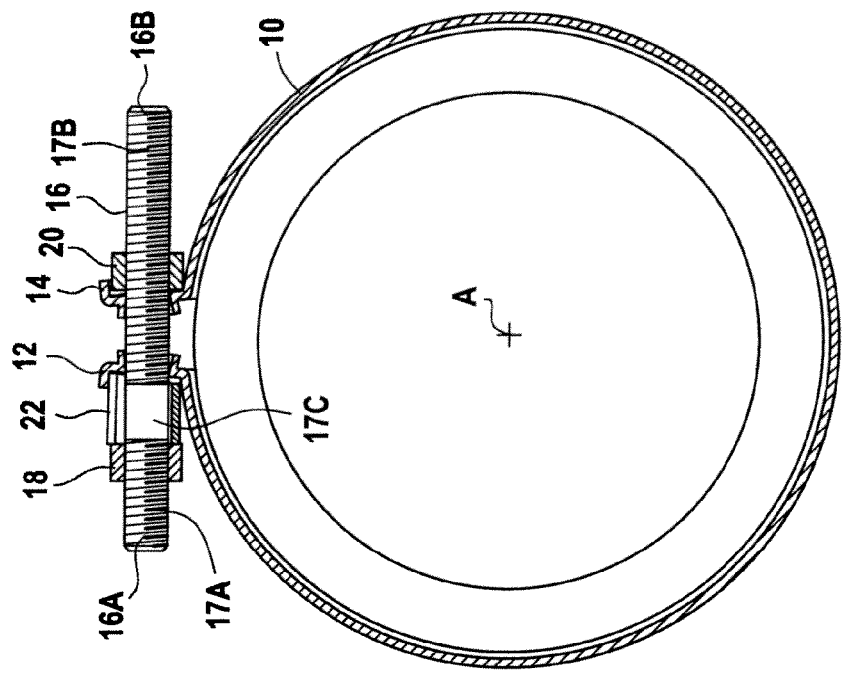
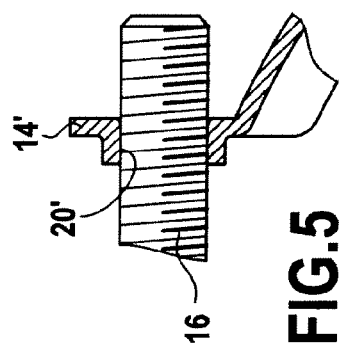
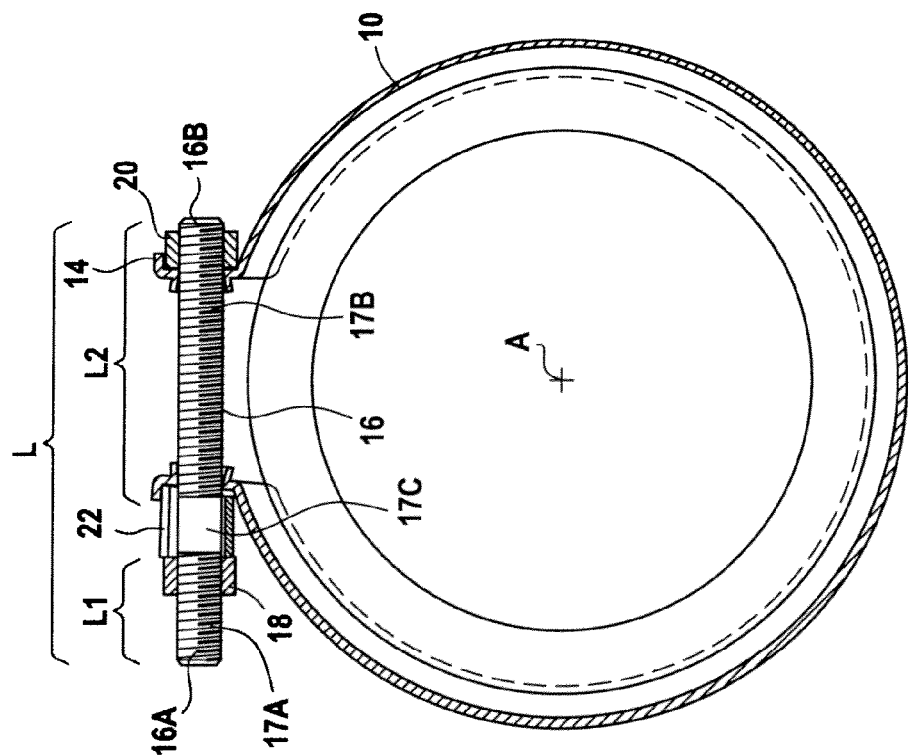

CLAMPING COLLAR TIGHTENED BY A THREADED ROD AND TWO NUTS

CROSS-REFERENCE TO RELATED APPLICATIONS

This application is the United States national phase of International Application No. PCT/FR2012/050510 filed Mar. 12, 2012, and claims priority to French Patent Application No. 1152239 filed Mar. 18, 2011, the disclosures of which are hereby incorporated in their entirety by reference.

BACKGROUND OF THE INVENTION

1. Field of the Invention

The present invention relates to a clamping collar comprising a belt carrying first and second tightening lugs, a threaded tightening rod, first and second nuts that co-operate respectively with the first lug and with the second lug and are suitable for co-operating respectively by screw engagement with the tightening rod so as to bring the lugs towards each other in such a manner as to tighten the collar.

2. Description of Related Art

Collars of this type are known, for example, from Documents EP 0 088 507 and GB 2804.

In order to tighten such collars, it is necessary to screw each of the two nuts onto the tightening rod, starting from its first and second ends respectively. Thus, the tightening operation is tedious, because it requires both nuts to be handled in order to tighten both of them on the threaded tightening rod. Ultimately, two end portions of the rod, of substantially equal lengths, extend on either side of the lugs.

Collars exist in which tightening by means of a threaded tightening rod is simplified. For such collars, the threaded tightening rod is a bolt having its head held stationary relative to a lug, so that it is either the head of the bolt or the nut co-operating with the other lug that needs to be screw driven in order to perform the tightening. For example, this is what is shown by Document EP 0 305 232. Although tightening is indeed simplified, those solutions suffer from problems of lack of compactness. At the end of tightening, the head of the bolt is situated against one lug, while the nut is situated against the other lug and the entire bolt portion over which the nut has moved projects beyond the lug with which said nut co-operates. That portion can be long because, in order to mount the collar on the article that is to be tightened, it is necessary for it to have a large diameter initially, which assumes that the length of the rod is relatively substantial.

To summarize, in existing solutions, it is necessary either to handle two nuts, which is tedious, or else to accept poor compactness due to the fact that the entire screwing length of the bolt is situated on one side only of a lug.

SUMMARY OF THE INVENTION

An object of the present invention is to improve that state of the art, by proposing a solution that makes it possible both to simplify tightening and also to avoid excessively poor compactness.

This object is achieved by the facts that the second nut is retained so that it is prevented from moving in rotation relative to the second lug, and that the tightening rod has first and second threads of the same direction that co-operate respectively with the first nut and with the second nut in such a manner that driving the first nut in its screwing direction successively causes the first nut to be screwed onto the first thread, the first nut to be stopped at the end of the first thread and the tightening rod to be driven, thereby screwing the tightening rod into the second nut.

It can be understood that, by means of these provisions, it suffices to handle only the first nut in order to perform the tightening. Driving the first nut in its screwing direction brings it into its final position on the threaded tightening rod (at the end of the first thread), in which position it acts as the head of a bolt because, when it is driven further in rotation in the same direction from this stage, it turns the tightening rod with it. Since the second nut is retained so that it is prevented from moving in rotation relative to the second lug, driving the tightening rod in this way by turning the first nut makes it possible to screw the second thread of the tightening rod into the second nut.

Thus, tightening is performed by driving a single nut in rotation. In addition, ultimately, two portions of the tightening rod correspond respectively to the first thread and to the second thread extend on either side of the lugs, thereby making it possible to improve compactness. In addition, the two lugs can be moved towards each other to the desired position, which position is determined, for the first nut, by it coming to the end of its stroke at the end of the first thread, and, for the second nut, by the desired tightening torque being reached and/or by the end of the second thread coming into contact with said second nut.

The first and second threads may be made in continuity with each other. They may even be two opposite segments of the same thread, the end of the first thread then being defined by any suitable means, e.g. by local flattening of the threads or by a circlip.

However, advantageously, the first and second threads are separated by a non-threaded portion.

This non-threaded portion defines the end of the first thread and blocks the first nut at the end of its stroke. In addition, it forms a visible marker enabling the tightening rod to be mounted correctly during assembly of the various parts.

It is stated above that the second nut is retained so that it is prevented from moving in rotation relative to the second lug. The second nut may be a part distinct from the second lug and it may be retained so that it is prevented from moving in rotation by the way it is mounted relative to said lug. For example, the second nut and the second lug (or a portion of the collar adjacent to said second lug) may have complementary shapes making such rotation-preventing retaining possible whenever the second nut is mounted. It is also possible for the second nut to be made in one piece with the second lug, as explained below. The second nut is thus part of the collar, forming an independent part or, conversely, being formed in one piece with the second lug, which is tapped so as to co-operate by screw engagement with the second thread of the threaded tightening rod.

Advantageously, the collar further comprises a spacer situated between the first lug and the first nut.

This spacer makes it possible to hold the first nut at the desired distance from the first lug. This makes it possible to drive the first nut in rotation so as to tighten the collar, without any hindrance relative to the first lug.

BRIEF DESCRIPTION OF THE DRAWINGS

The invention can be well understood and its advantages appear more clearly on reading the following detailed description of an embodiment shown by way of non-limiting example. The description refers to the accompanying drawings, in which:

FIG. 3 is also a side view, seen from the same side as in FIG. 2, but showing an intermediate state of tightening, in which the first nut has reached the end of the first thread;

FIG. 4 is also a side view, showing the collar at the end of tightening, once the threaded tightening rod has been screwed into the second nut; and FIG. 5 shows a variant for the second nut.

DESCRIPTION OF THE INVENTION

Figure 2:
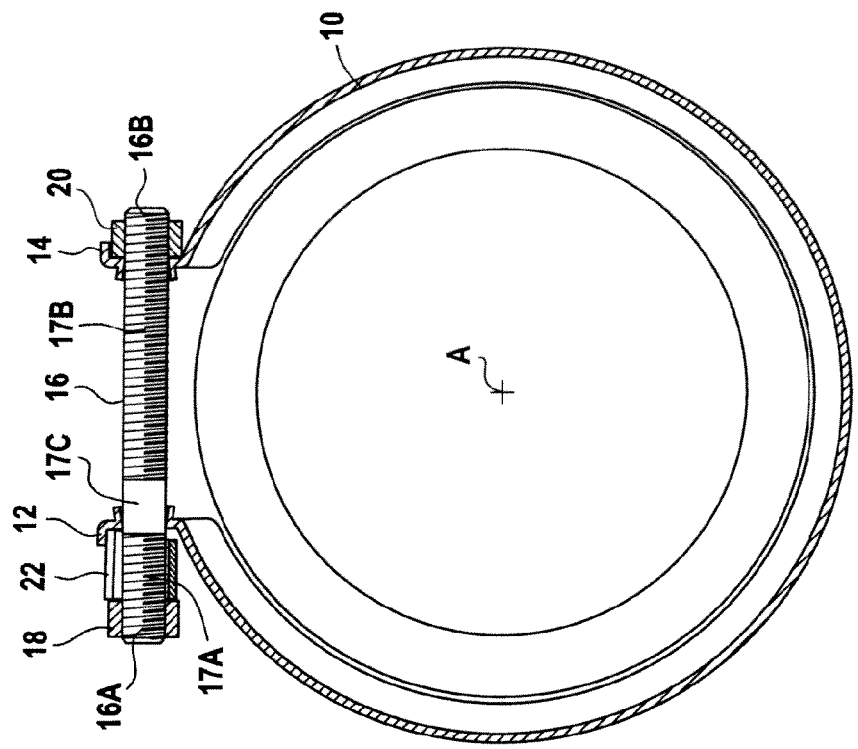
FIG. 2 is a side view of the FIG. 1 collar, in the non-tightened state.

The collar shown in the figures comprises a belt 10, in particular a metal belt, with a first lug 12 and a second lug 14 that project at right angles substantially radially relative to the belt, which is looped back onto itself about the axis A of the collar.

The collar also has a threaded tightening rod 16, a first nut 18 that co-operates with the first lug 12, and a second nut 20 that co-operates with the second lug 14. The threaded tightening rod passes through holes in the lugs 12 and 14, so that its two opposite ends 16A and 16B are situated on either side of the lugs.

In the meaning of the above, the term "co-operates" means that, when the nuts 18 and 20 and the threaded tightening rod 16 move relative to one another in the direction in which the nuts are screwed onto the rod, the nuts react against the lugs and that reaction tends to move the lugs closer together in such a manner as to tighten the collar. In this example, in FIG. 1, the second nut 20 bears directly against the second lug 14. The first nut 18 co-operates with the first lug 12 via a spacer 22 that holds the first nut 18 apart from the first lug 12. For example, this spacer may be implemented as described in Patent EP 1 540 229.

Figure 1:
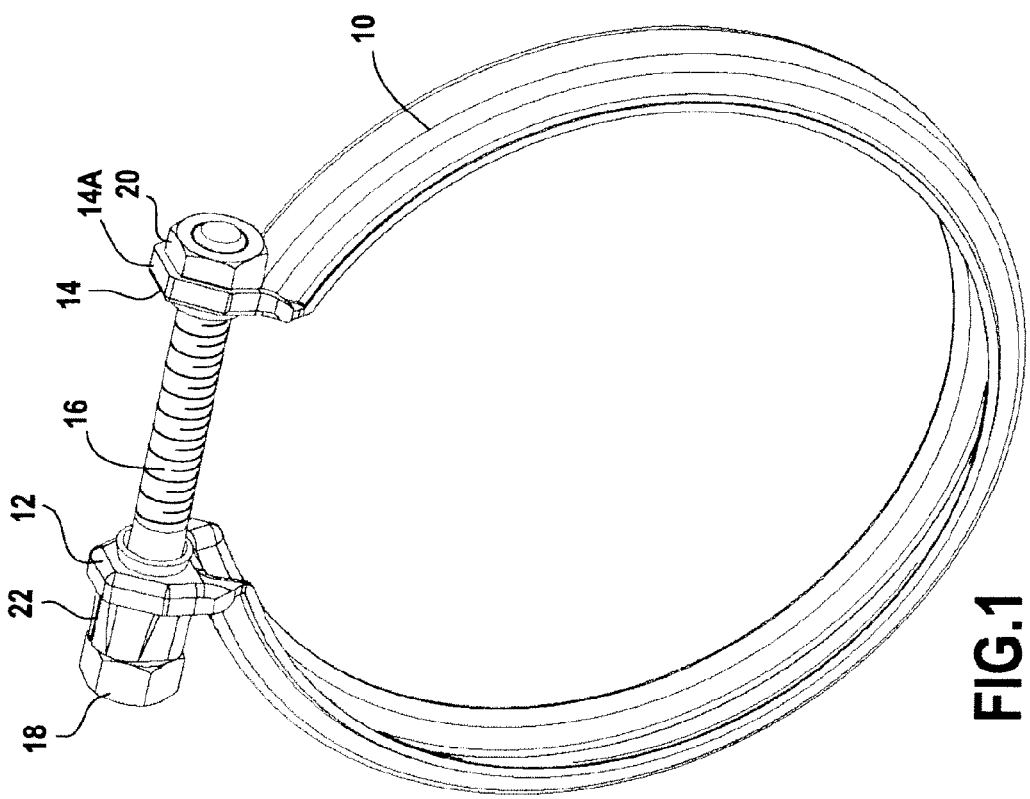
FIG. 1 is a perspective view of a clamping collar of the invention, in the non-tightened state.

In the example shown, the belt 10 has a recessed cross-section. This cross-section is particularly suitable for clamping together the ends of the two tubes, situated facing each other and having flares that fit into the recess in the belt. However, it should be understood that the invention may also apply to collars having belts that have other shapes, in particular belts of flat cross-section. It may even apply to belts having concave cross-sections in which the cavities are situated on the outside, i.e. the reverse of what is shown in FIG. 1.

As can be seen more clearly in FIGS. 2 to 4, the tightening rod 16 has a first thread 17A that extends to the first end 16A of the rod and with which the first nut 18 co-operates, as well as a second thread 17B that is situated on the same side as the second end 16B of the rod and with which the second nut 20 co-operates.

It can be seen in these figures that the first and second threads are of the same direction. In this example, both threads 17A and 17B are of the "right-hand thread" type, which means that the nut 18 is screwed onto the first thread 17A by being driven rightwards in rotation and that the second thread is screwed into the second nut 20 by the tightening rod 16 also being driven rightwards in rotation.

Naturally, the configuration may be reversed, because it is possible to choose left-hand threads for the threads 17A and 17B. However, the thread direction shown in the drawings is advantageous. The rightward direction of driving of a nut on a threaded rod is naturally the screwing direction of said nut. Similarly, driving a bolt rightwards in rotation is the natural direction for screwing it. Thus, with this configuration, the collar is tightened by a conventional continuous screw-driving movement, rightwards, applied to the first nut.

More precisely, in order to clamp the collar of the invention, firstly the first nut 18 is driven in the direction in which it is screwed onto the first thread 16. At the end of this screw driving, the first nut 18 reaches the end of its stroke and stops at the end of the first thread 17A that is situated at the end 16B of the threaded tightening rod. This is the situation that is shown in FIG. 3. In this situation, there has still been no relative movement between the tightening rod 16 and the second nut 20. However, from the moment when the first nut 18 reaches the end of its stroke at the end of the first thread 17A, continuing to drive the first nut 18 in its screwing direction causes the assembly made up of the tightening rod and of the first nut to behave like a tightening nut-and-bolt assembly. In other words, as from that moment, the first nut 18 moving in rotation drives the threaded tightening rod 16 with it in rotation in the same direction.

Therefore, since the second nut 20 is retained so that it is prevented from moving in rotation relative to the second lug 14 of the collar, this causes the threaded tightening rod 16 to be screwed into said second nut 20. As can be seen in FIG. 4, this screwing brings the two lugs 12, 14 towards each other, and the collar can thus be tightened. It can be observed in FIG. 4 that, when the collar is in the tightened situation, the two opposite ends of the rod protrude respectively beyond the first lug and beyond the second lug. In other words, the rod is balanced on either side of the two lugs without being detrimental to compactness by protruding on one side of the lugs, over a longer span.

The second nut 20 is retained so that it is prevented from moving in rotation relative to the second lug 14 as of being mounted on the collar. For example, this second nut may have one or more flats (it can be a conventional nut of the six-sided type), and the lug 14 is provided with a turned-back lip 14A that comes to cover at least some of said flat in such a manner as to retain the second nut so as to prevent it from moving in rotation relative to the lug 14. Naturally, other rotation-preventing retaining means may be considered, e.g. as in Patent EP 0 305 232 that discloses a nut having a notch that fits the outside shape of the belt of the collar.

It is also possible, as shown in FIG. 5, to make provision for the second nut 20' to be made in one piece with the second lug 14' of the collar. For example, the hole in said second lug, through which hole the tightening rod 16 passes, can have an axial sleeve (i.e. a sleeve that extends parallel to the axis of the rod) that is internally tapped. For example, the sleeve may be formed by material being pushed away while forming the hole in the lug 14, and may be tapped in a subsequent operation.

However, in the example shown in FIGS. 1 to 4, the holes in the lugs 12 and 14, through which holes the bolt passes, are flanked by sleeves that flare slightly going inwards (i.e. in the direction going from one sleeve to the other) so as to make it possible for a small amount of relative angular movement to take place between the tightening rod and the lugs, thereby making it easier for the lugs to be tuned out, which takes place while the diameter of the collar is being reduced due to it being tightened.

As indicated above, the first nut 18 co-operates with the first lug 12 via a spacer 22. This spacer serves to hold the first nut spaced apart from the lug, in such a manner as to facilitate access to said first nut for a tightening tool, which can surround it to come into engagement with it over its entire periphery.

As can be seen in the figures, the first and second threads 17A and 17B are separated by a non-threaded portion 17C of the tightening rod. The end of the first thread 17A at which the first nut stops at the end of its stroke is determined by the end of the non-threaded portion 17C that is closer to the end 16A of the rod. As can be seen in FIG. 4, this non-threaded portion finds itself inside the spacer 22 when the collar is tightened, so that it does not contribute in any way to the tightening. By providing this gap between the facing ends of the first and second threads 17A and 17B, not only is a visible marker present to enable the rod 16 to be mounted the right way round, but also a buffer zone is present between the two threads, thereby facilitating manufacture thereof.

FIG. 3 indicates the lengths L1 of the first thread 17A, L2 of the second thread 17B, and L of the tightening rod 16. The length L1 advantageously lies in the range one fifth to one half of the length L. Thus, by also taking into account the presence of the spacer, provision is made so that, when the collar is tightened, the portion of the rod that finds itself between the two lugs 14 and 16 is the middle portion of said rod. The length L1 is the length over which the first thread extends from the first end of the rod, while the length L2 is the length over which the second thread extends starting from the second end of the rod.

It is advantageous for both threads to have the same pitch, i.e. for the spacing between two consecutive threads to be the same for both of them. Thus, the speed at which the lugs are moved closer together as a function of the speed of rotation of the tightening tool that drives firstly the first nut 18 and then the assembly comprising the tightening nut and the first nut is substantially constant. Naturally, it is however possible to choose a pitch for the second thread 17B that is different from the pitch of the first thread.

The invention claimed is:

1. A clamping collar comprising a belt carrying first and second tightening lugs, a threaded tightening rod, first and second nuts that co-operate respectively with the first lug and with the second lug and are suitable for co-operating respectively by screw engagement with the tightening rod so as to bring the lugs towards each other in such a manner as to tighten the collar, the second nut being retained so that said second nut is prevented from moving in rotation relative to the second lug and in that the tightening rod has first and second threads of the same direction that co-operate respectively with the first nut and with the second nut in such a manner that driving the first nut in the screwing direction thereof successively causes said first nut to be screwed onto the first thread, the first nut to be stopped at the end of the first thread and the tightening rod to be driven, thereby screwing said tightening rod into the second nut.

2. The clamping collar according to claim 1, wherein the first and second threads are separated by a non-threaded portion.

3. The clamping collar according to claim 2, wherein the second nut is formed in one piece with the second lug.

4. The clamping collar according to claim 2, wherein the first thread extends from the first end of the tightening rod, over a length lying in the range one fifth of the length of the tightening rod to one half of said length.

5. The clamping collar according to claim 1, wherein the second nut is formed in one piece with the second lug.

6. The clamping collar according to claim 1, wherein the first thread extends from the first end of the tightening rod, over a length lying in the range one fifth of the length of the tightening rod to one half of said length.

7. The clamping collar according to claim 1, further comprising a spacer situated between the first lug and the first nut.

8. The clamping collar according to claim 1, wherein the two threads have the same pitch.

* * * * *